(12) United States Patent
Burdeti (10) Patent No.: US 8,142,331 B2
(45) Date of Patent: Mar. 27, 2012

(54) VEHICLE ENGINE SHUTDOWN PREVENTION SYSTEM

(75) Inventor: Radu Ioan Burdeti, Deux-Montagnes (CA)

(73) Assignee: Studio Allumage, Inc., Terrebonne, CA (US)

(*) Notice: Subject to any disclaimer, the term of this patent is extended or adjusted under 35 U.S.C. 154(b) by 248 days.

(21) Appl. No.: 12/729,647

(22) Filed: Mar. 23, 2010

(65) Prior Publication Data
US 2011/0237391 A1 Sep. 29, 2011

(51) Int. Cl.
*B60W 10/04* (2006.01)
(52) U.S. Cl. ....................................... 477/111
(58) Field of Classification Search ................ None
See application file for complete search history.

(56) References Cited

U.S. PATENT DOCUMENTS

| | | | |
|---|---|---|---|
| 3,913,086 A | 10/1975 | Adler et al. | |
| 4,362,133 A | 12/1982 | Malik | |
| 4,674,454 A | 6/1987 | Phairr | |
| 4,884,573 A | 12/1989 | Wijay et al. | |
| 6,135,920 A | 10/2000 | Kamiya et al. | |
| 6,371,889 B1 | 4/2002 | Kuroda et al. | |
| 6,532,926 B1 | 3/2003 | Kuroda et al. | |
| 6,727,800 B1 | 4/2004 | Dutu | |
| 6,799,546 B1 | 10/2004 | Gonring et al. | |
| 7,091,629 B2 | 8/2006 | Hawkins | |
| 7,138,904 B1 | 11/2006 | Dutu | |
| 7,324,879 B2 | 1/2008 | Blyden et al. | |
| 7,618,820 B2 | 11/2009 | Sherman et al. | |
| 8,016,719 B2 * | 9/2011 | Hecht et al. ...................... 477/94 |
| 2006/0087405 A1 | 4/2006 | Koike et al. | |
| 2006/0244575 A1 | 11/2006 | Ramirez et al. | |
| 2009/0298643 A1 * | 12/2009 | Chung ............................. 477/99 |

FOREIGN PATENT DOCUMENTS
EP 1052399 11/2000

OTHER PUBLICATIONS
The International Search Report of PCT/CA20113000180.

* cited by examiner

*Primary Examiner* — Dirk Wright
(74) *Attorney, Agent, or Firm* — Norton Rose Canada LLP (57) ABSTRACT

A vehicle engine shutdown prevention system with a position determination module and a blocking unit. The module is adapted to be connected to the transmission for determining if it is engaged in a position included in a first or a second group of positions, the second group including at least one position for which the vehicle remains stationary when the engine is shut down, and the first group including the remaining positions. The module emits a block signal when the transmission is engaged in one of the first group of positions. The blocking unit is adapted to define the only path through which a stop engine signal may circulate from the switch to the engine control unit. The blocking unit blocks the path between the switch and the engine control unit when it receives the block signal.

19 Claims, 8 Drawing Sheets

VEHICLE ENGINE SHUTDOWN PREVENTION SYSTEM

FIELD OF THE INVENTION

The present invention relates to engine shutdown systems, more particularly to such systems that are keyless.

BACKGROUND ART

In vehicles having push-button starters, when the push-button is actuated to turn off a running engine while a transmission of the vehicle is engaged in a "drive" position, the vehicle may begin to move forwards or backwards after the engine has been shut down. This unintentional movement of the vehicle when the engine is turned off can be dangerous for people in proximity of the vehicle, for the driver of the vehicle and/or for the vehicle itself.

Previous systems have been known to provide audio and/or visual warnings when the engine of a vehicle is shut down while the transmission of the vehicle is engaged in a "drive" position. However, such warnings may be ignored or may be defective. In addition, these systems do not prevent the engine of the vehicle from shutting down, and as such, the danger of unintentional movement of the vehicle remains.

Accordingly, improvements are desirable.

SUMMARY

It is therefore an aim of the present invention to provide an improved safety system for an engine shutdown system.

Therefore, in accordance with the present invention, there is provided a vehicle engine shutdown prevention system comprising a position determination module adapted to be connected to a transmission of the engine for determining if the transmission is engaged in a position included in a first group of transmission positions or in a second group of transmission positions, the second group including at least one position for which the vehicle remains stationary when the engine is shut down, and the first group including all the transmission positions which are not included in the second group, the position determination module emitting a block signal when the transmission is engaged in one of the first group of positions, and a blocking unit adapted to interconnect a user actuated switch and an engine control unit and to define the only path through which a stop engine signal for turning off the engine may circulate from the user actuated switch and the engine control unit, the blocking unit receiving the block signal from the position determination module, the blocking unit blocking the path between the user actuated switch and the engine control unit when said blocking unit receives the block signal, such as to prevent the stop engine signal from circulating from the user actuated switch to the engine control unit when the transmission is engaged in one of the first group of positions.

Also in accordance with the present invention, there is provided a method for selectively preventing an engine of a vehicle from being turned off, the method comprising receiving a signal indicative of a position of a transmission of the engine, determining if the position of the transmission is part of a first or second group of transmission positions, the second group including at least one position for which the vehicle remains stationary when the engine is shut down, the first group including all the transmission positions which are not included in the second group, activating a blocking unit when the transmission is engaged in a position which is included in the first group, and with the activated blocking unit, preventing a stop engine signal from being transmitted from a user actuated switch to an engine control unit, such as to prevent the switch from actuating the engine control unit to turn off the engine when the transmission is engaged in one of the first group of transmission positions.

BRIEF DESCRIPTION OF THE DRAWINGS

Reference will now be made to the accompanying drawings, showing by way of illustration a particular embodiment of the present invention and in which.

DETAILED DESCRIPTION OF PARTICULAR EMBODIMENTS

Figure 1:
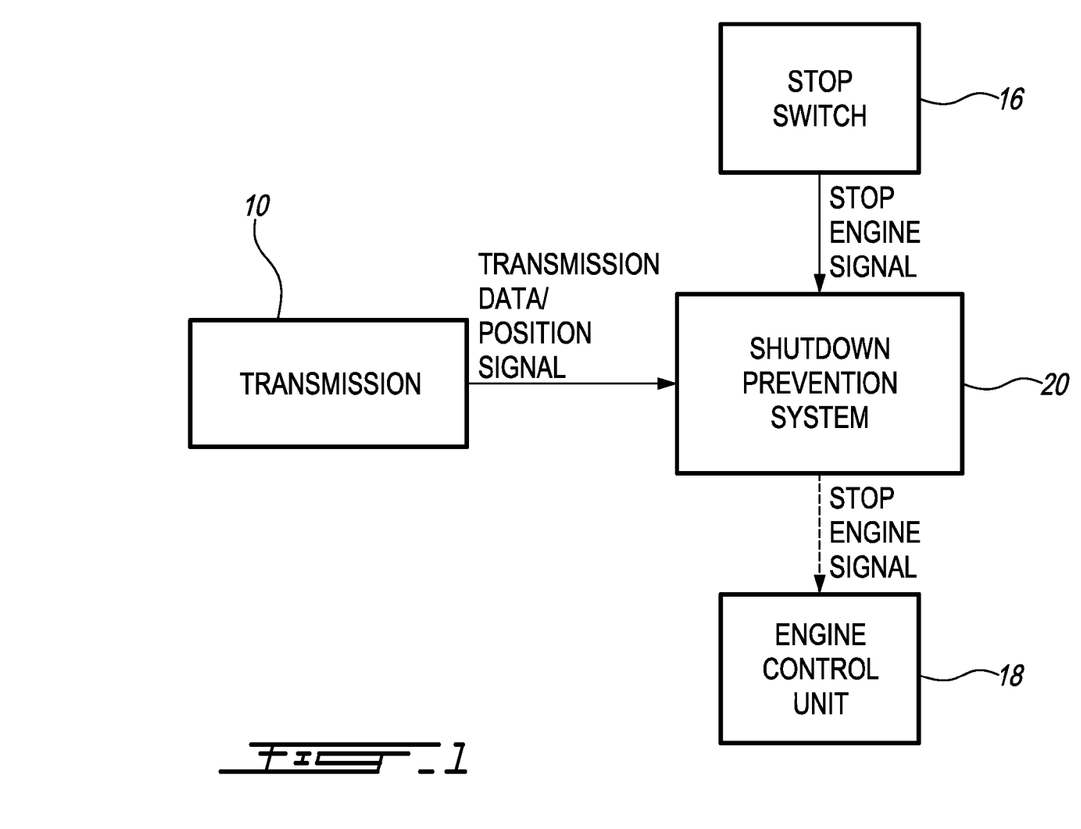
FIG. 1 is a block diagram of an engine control system including a shutdown prevention system in accordance with a particular embodiment.

A vehicle engine shutdown prevention system or safety system is generally shown at 20, as seen in FIG. 1. The shutdown prevention system 20 generally receives transmission data or a position signal from a transmission 10 of the vehicle, and selectively prevents a stop engine signal emitted by a user actuated stop switch 16 from reaching an engine control unit 18 of the vehicle. In a particular embodiment, the stop switch 16 is a push-button starter which is also used to start the engine of the vehicle. Alternately, the stop switch 16 may be another type of system, for example, a fingerprint-actuated system, or any other type of keyless control allowing the engine to be shut down. The engine control unit 18 (ECU), also known in the art as a power-train control module (PCM) or engine control module (ECM), shuts down the running engine upon receiving the stop engine signal, among other functions.

The shutdown prevention system 20 determines whether the transmission 10 is engaged in a position included in a first or in a second group of transmission positions. The first group of transmission positions comprises positions for which a vehicle may keep moving even with the engine shut down. In a particular embodiment, the first group of transmission positions includes "Drive", "Reverse", "first gear" to "fifth gear" inclusively, "Overdrive", or various other positions known in the art for moving a vehicle, for example "L" (low). The second group of transmission positions comprises positions in which it is considered to be safe to shut down the engine, i.e. generally the positions for which the vehicle will remain stationary when the engine is shut down. In a particular embodiment, the second group of transmission positions includes a single position, "Park". In an alternate embodiment, the transmission position "Neutral" is also included in the second group. Note that any transmission position not included in the first group is included in the second group such that all transmission positions are either in the first or the second group. The shutdown prevention system 20 prevents the stop engine signal from reaching the engine control unit 18 of the vehicle when the transmission 10 is engaged in a position included in the first group, such as to prevent the engine to be shut down upon actuation of the stop switch 16. The shutdown prevention system 20 however allows the stop engine signal from reaching the engine control unit 18 of the vehicle when the transmission 10 is engaged in a position included in the second group.

Figure 2:
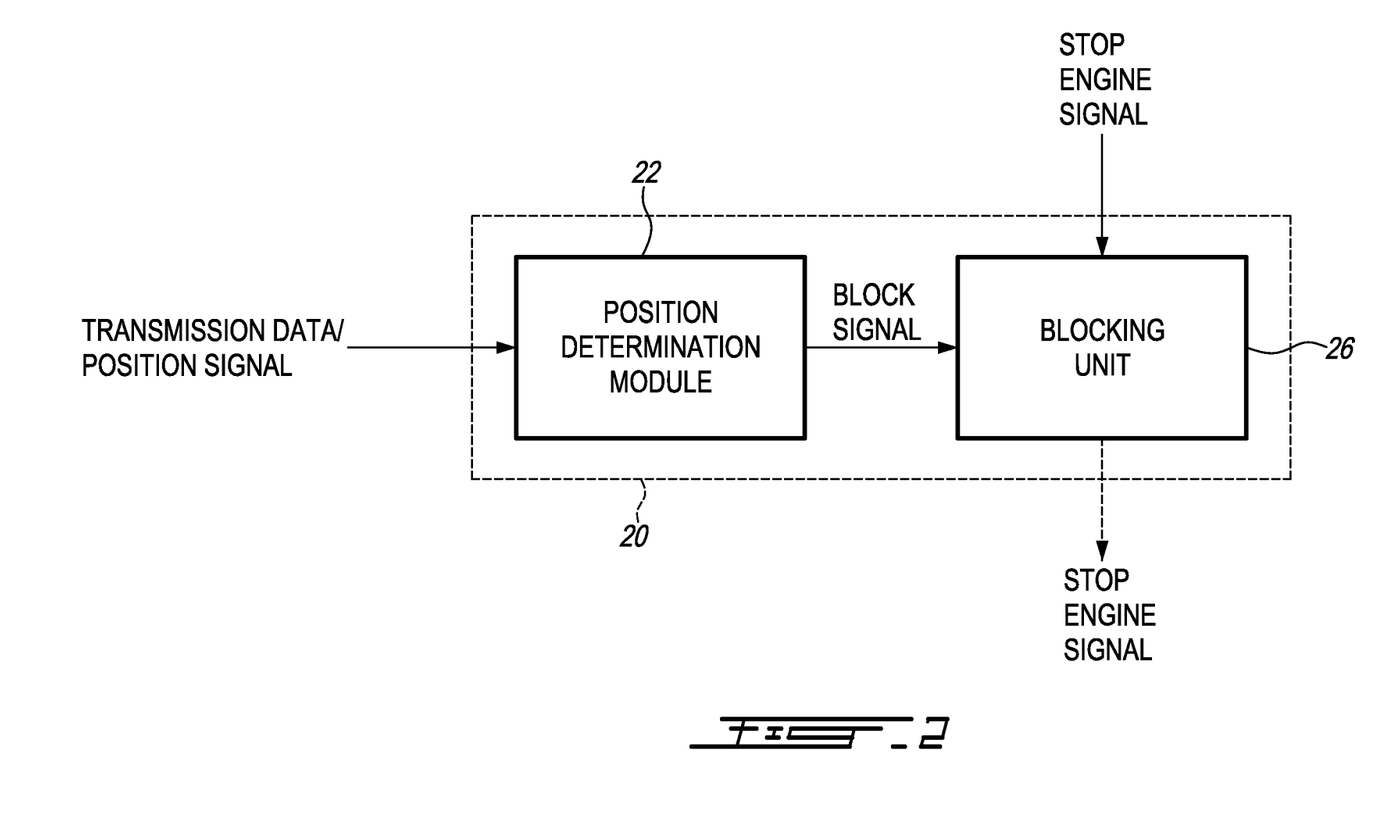
FIG. 2 is a block diagram of the shutdown prevention system of FIG. 1.

Referring to FIG. 2, the shutdown prevention system 20 comprises a position determination module 22 and a blocking unit 26. The position determination module 22 receives the transmission data or position signal from the transmission 10 of the vehicle, and sends a block signal to the blocking unit 26 when the transmission is engaged in a position which is part of the first group. The blocking unit receives the stop engine signal from the stop switch 16, and the block signal from the position determination module. Upon reception of the block signal, the blocking unit 26 blocks the stop engine signal so that it does not reach the engine control unit 18. When the block signal is not received, the blocking unit 26 transmits the stop engine signal to the engine control unit 18.

In a particular embodiment, the blocking unit 26 defines the only connection through which the stop engine signal may circulate between the stop switch 16 and the engine control unit 18. The blocking unit 26 may comprise various components capable of blocking a signal, for example a safety switch, a relay, a knob, a thyristor, a triac, etc.

Figure 3A:
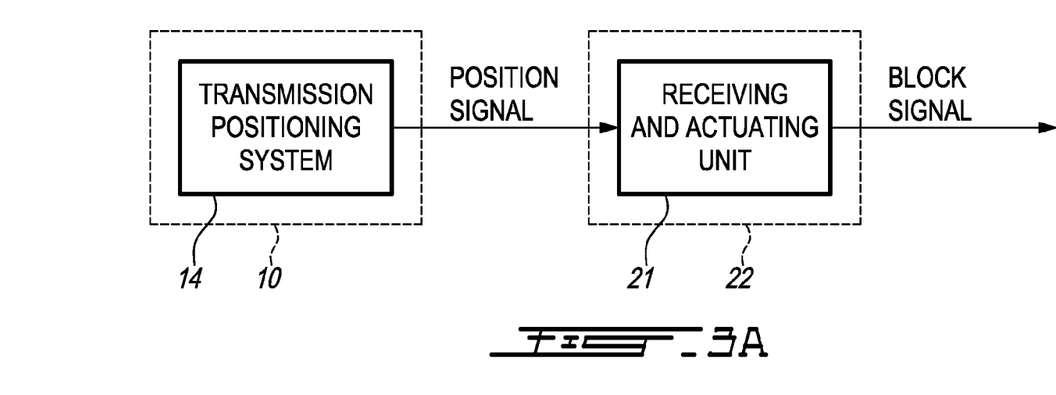
FIG. 3A-3D are block diagrams of alternate configurations for a position determination module of the system of FIG. 2.

Referring to FIG. 3A, in a particular embodiment, the transmission 10 includes a transmission positioning system 14 which produces a position signal indicative of the position of the transmission 10. The position determination module 22 includes a receiving and actuating unit 21, which receives the position signal and emits the block signal if the transmission is engaged in a position which is part of the first group.

Figure 3B:
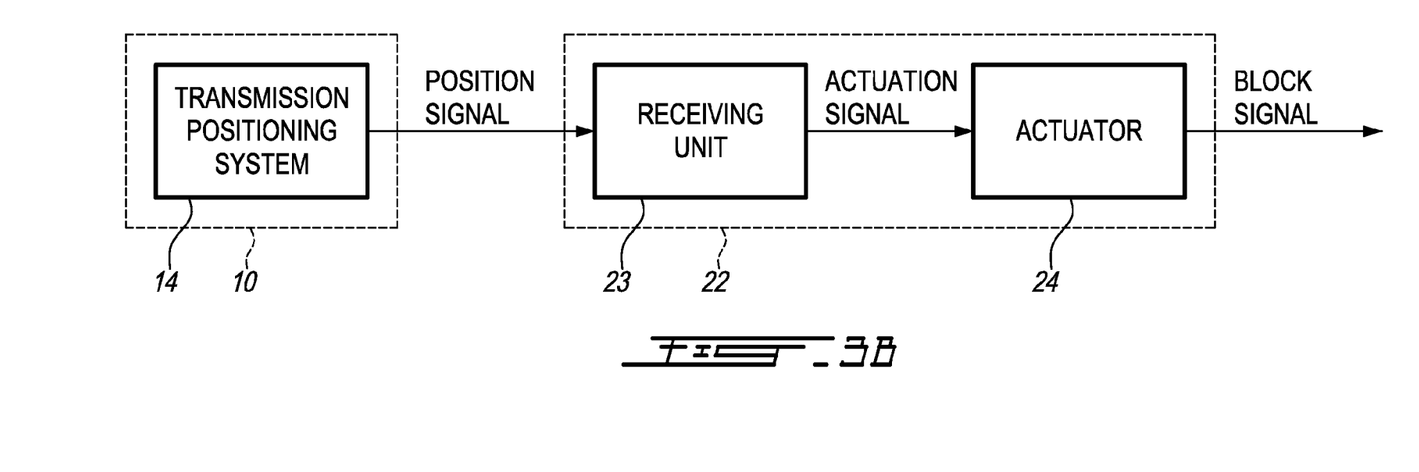

In an alternate embodiment shown in FIG. 3B, the position determination module 22 includes a receiving unit 23 which receives the position signal from the transmission positioning system 14 of the transmission 10, and emits an actuation signal if the transmission is engaged in a position which is part of the first group. The position determination module 22 also includes an actuator which, upon reception of the actuation signal, emits the block signal.

Figure 3C:
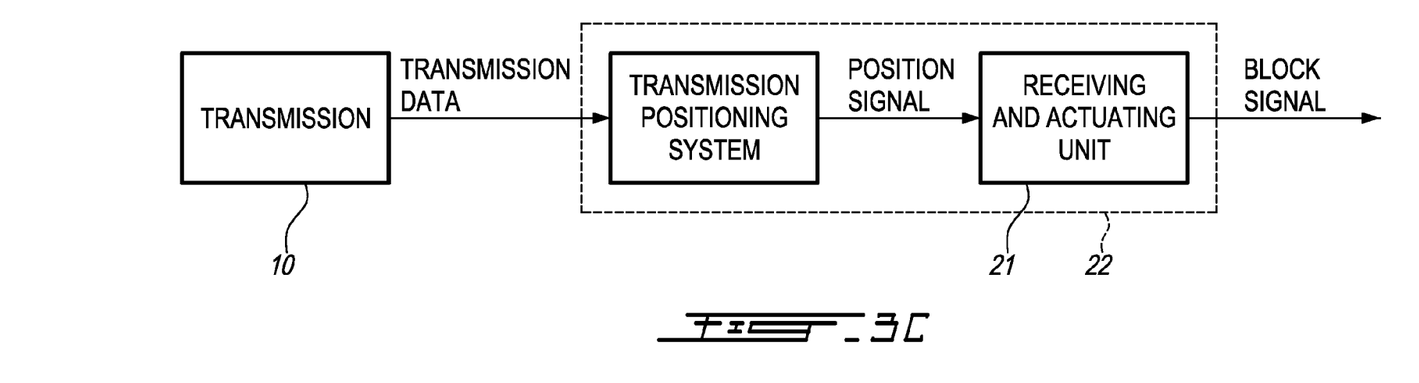
Figure 3D:
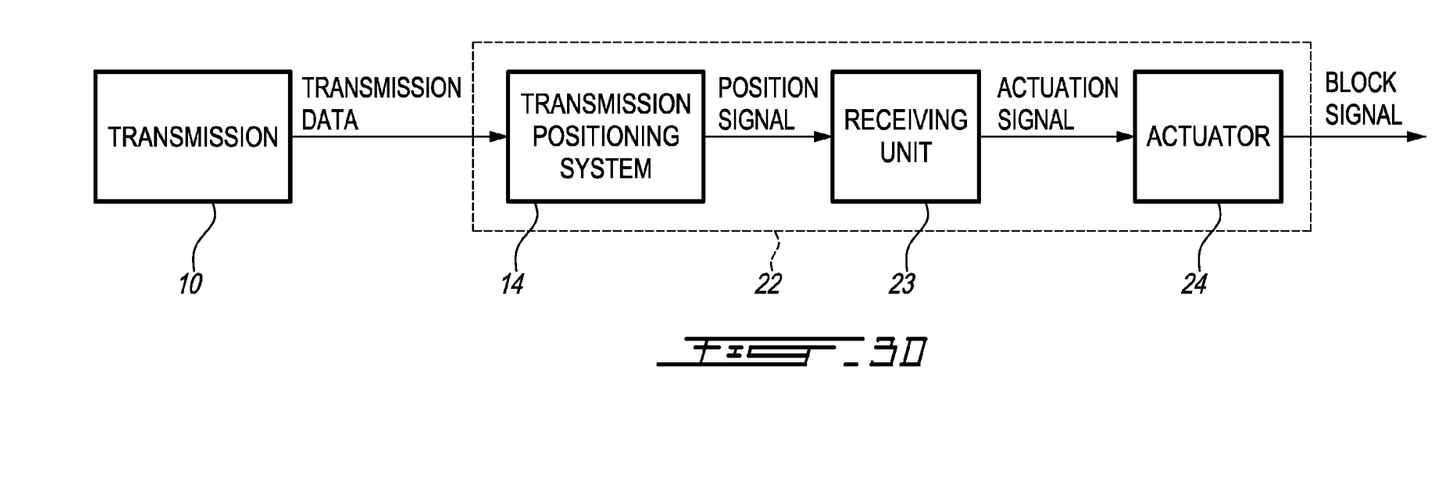

In alternate embodiments shown in FIGS. 3C-D, the position determination module 22 includes the transmission positioning system 14, which receives transmission data from the transmission 10, and emits a position signal accordingly. In this case, the transmission positioning system 14 of the position determination module 22 is distinct from that already included in the vehicle, if applicable. The position determination module 22 can include the receiving and actuating unit which receives the position signal and emits the block signal if the transmission is engaged in a position which is part of the first group (see FIG. 3C) or the receiving unit 23 which receives the position signal and emits the actuation signal if the transmission is engaged in a position which is part of the first group, and the actuator which, upon reception of the actuation signal, emits the block signal (see FIG. 3D).

In all of the above embodiments, the blocking unit 26 transmits the stop engine signal to the engine control unit 18 by default, i.e. every time the block signal is not received.

In an alternate embodiment which is not shown, the position determination module 22 emits a no block signal when the transmission is engaged in a position which is part of the second group, and the blocking unit 26 transmits the stop engine signal to the engine control unit 18 only upon reception of the no block signal. The no block signal can be used with the block signal, or can alternately be used in replacement thereof, in which case the blocking unit 26 blocks the stop engine signal by default, i.e. every time the no block signal is not received.

It should be noted that all signals mentioned herein may comprise any electrical, light pulse or frequency-type signals, whether in a wire, a fibre, or wireless.

Figure 4:
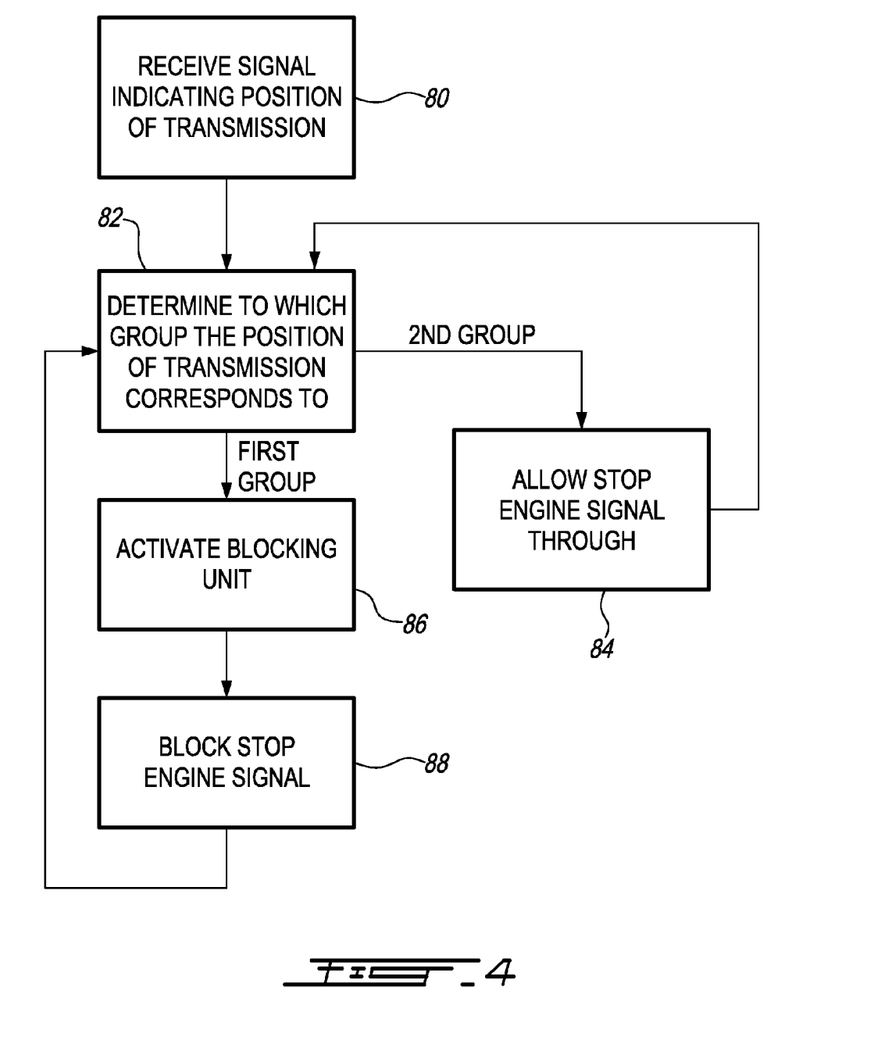
FIG. 4 is a flowchart of a method of operation of the system of FIG. 1.

In use and referring to FIG. 4, the receiving and actuating unit 21 or the receiving unit 23 receives the position signal indicating the position of the transmission 10, as illustrated in step 80. As mentioned above, the position signal is emitted by the transmission positioning system 14 which is either included in the transmission 10 or in the position determination module 22.

The position determination module 22 then determines from the position signal if the transmission position is part of the first or second group, as illustrated in step 82.

If the transmission 10 is engaged in a position included in the second group, as shown in step 84, the blocking unit 26 allows the stop engine signal to be transmitted to the engine control unit 18, and as such, if the stop switch 16 is actuated, the engine of the vehicle is shut down. As mentioned above, in the particular embodiments shown, the blocking unit 26 is configured such as to allow the stop engine signal to be transmitted to the engine control unit 18 as a default position, and as such step 84 is a "no action" step. As shown in step 82, as long as the engine is running, the position determination module 22 continues to determine from the position signal if the transmission position is part of the first or second group, and step 84 of allowing the stop engine signal to be transmitted to the engine control unit 18 is performed as long as the position is part of the second group.

If the transmission 10 is engaged in a position included in the first group, as shown in step 86, the blocking unit 26 is activated by the block signal which is emitted by the position determination module 22.

Once the blocking unit 26 is activated, the blocking unit 26 blocks the stop engine signal emitted by the stop switch 16, as illustrated in step 88. As such, since the engine control unit does not receive the stop engine signal, actuating the stop switch 16 will not shut down the engine. The system then goes back to step 82, where the position determination module 22 continues to determine from the position signal if the transmission position is part of the first or second group, such as to be able to shut down the vehicle once the transmission is engaged in a position which is part of the second group.

Figure 5:
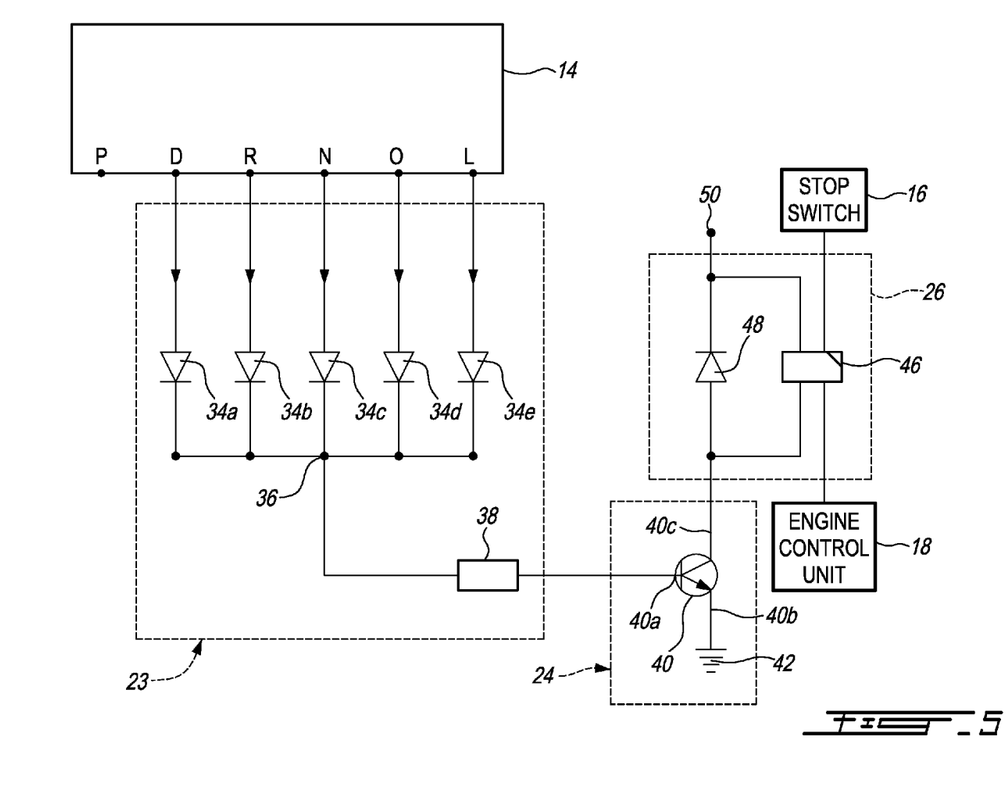
FIG. 5 is a schematic view of the system of FIG. 1, in accordance with a particular embodiment.

One particular embodiment of the shutdown prevention system 20 of FIG. 3B or 3D is shown in FIG. 5. The transmission in this particular case includes six (6) positions, namely P (Park), D (Drive), R (Reverse), N (Neutral), O (Overdrive) and L (Low), and the transmission positioning system 14 includes an output for each transmission position, on which a voltage is applied if the transmission is engaged in the corresponding position. The receiving unit 23 includes five diodes 34a,b,c,d,e which are connected to a respective output of the transmission positioning system 14 defining the positions which are part of the first group, namely D, R, N, O and L, respectively. The second group of transmission positions includes a single position, namely P (Park), the output of which is not connected to the receiving unit 23. The diodes 34a-e are connected to a same resistance 38 via a node 36. If the transmission is engaged in Park, no signal is transmitted to the receiving unit 23. If the transmission is engaged in a position included in the first group, the transmission positioning system 14 emits a signal through the respective output D, R, N, O or L, which is transmitted through the respective diode 34a-e and the resistance 38. The resistance 38 is selected to limit the current exiting the receiving unit 23 to a predetermined acceptable level. In a particular embodiment, the resistance 38 is a 1KΩ/0.5 W resistance.

The actuator 24 includes a transistor 40 including a first electrode 40a connected to the resistance 38, a second electrode 40b connected to ground 42, and a third electrode 40c. When a signal is transmitted from the resistance 38 to the first electrode 40a, the transistor 40 opens a channel between the second and third electrodes 40b,c. The transistor 40 can be any appropriate type of transistor know in the art, for example FET (MOSFET, JFET), BJT (NPN, PNP), etc.

The blocking unit 26 comprises a relay 46 in parallel with a diode 48, which are connected to the emitter electrode 40c of the transistor 40 and to a power source 50. In a particular embodiment, the power source 50 has a 12 volt capacity.

When the transistor 40 receives the signal from the transmission positioning system 14 through the resistance 38, the open channel between the second and third electrodes 40b,c allows current to flow from the power source 50 to ground 42, thereby generating a current across the relay 46. The diode 48 limits the voltages induced and ensures that the relay 46 opens and closes firmly. The relay 46 interconnects the stop switch 16 and engine control unit 18, and is normally closed to allow the stop engine signal from circulating therebetween. The relay 46 opens only when the current passes therethrough, thus interrupting the connection between the stop switch 16 and the engine control unit 18 and preventing transmission of the stop engine signal.

Figure 6:
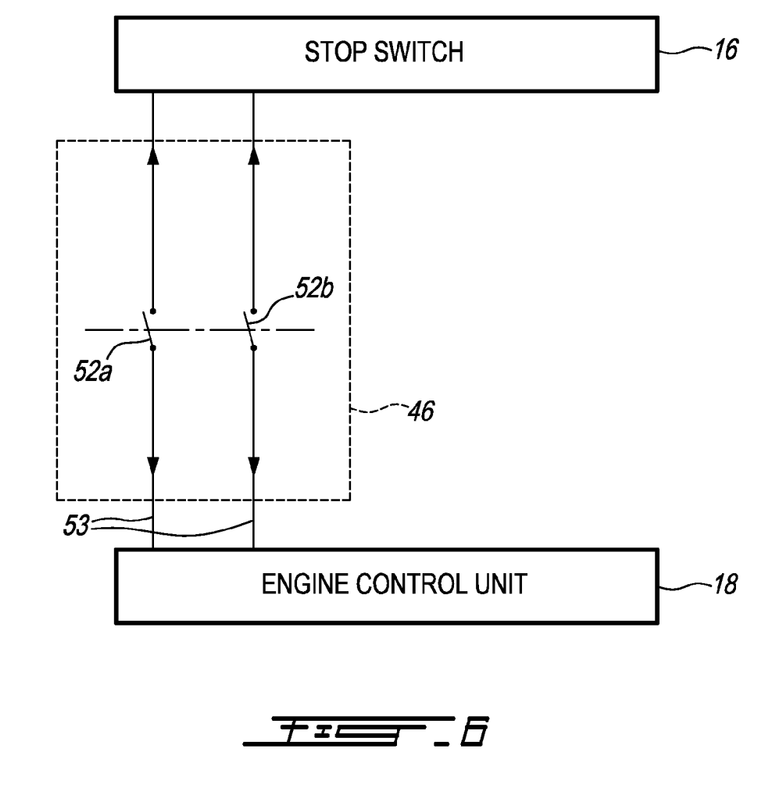
FIG. 6 is a schematic view of a relay of the system of FIG. 5.

Referring to FIG. 6, in a particular embodiment, the relay 46 includes two switches 52a,b which define a path 53 from the stop switch 16 to the engine control unit 18 for circulation of the stop engine signal therebetween. The switches 52a,b are normally closed and open when the relay 46 is energized.

Figure 7:
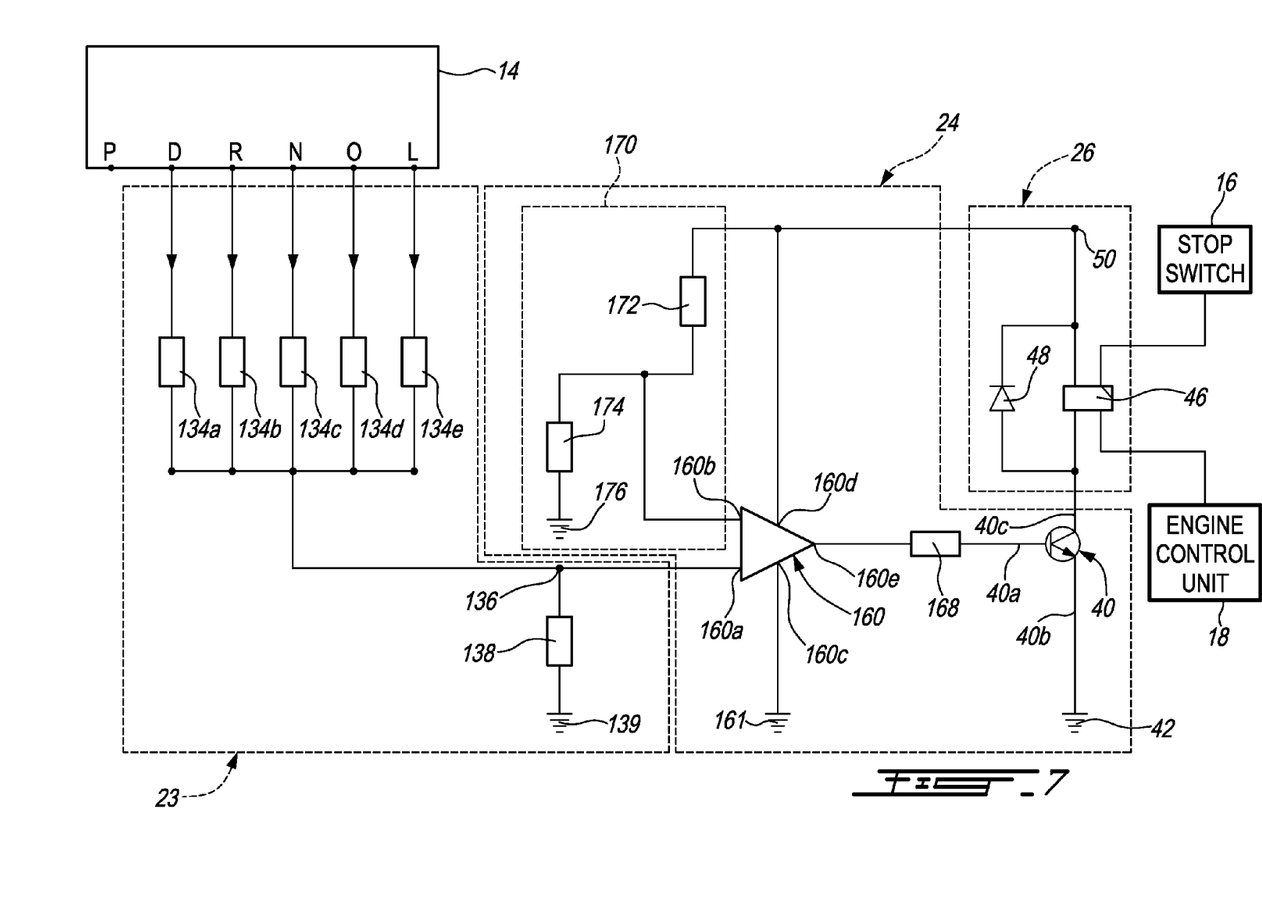
FIG. 7 is a schematic view of the system of FIG. 1, in accordance with another particular embodiment.

Another particular embodiment of the shutdown prevention system 20 of FIG. 3B or 3D is shown in FIG. 7. The transmission in this particular case also includes six (6) positions, namely P (Park), D (Drive), R (Reverse), N (Neutral), O (Overdrive) and L (Low), and the transmission positioning system 14 includes an output for each transmission position, on which a voltage is applied if the transmission is engaged in the corresponding position. The receiving unit 23 includes five resistances 134a,b,c,d,e which are connected to a respective output of the transmission positioning system 14 defining the positions which are part of the first group, namely D, R, N, O and L, respectively. The second group of transmission positions includes a single position, namely P (Park), the output of which is not connected to the receiving unit 23. In a particular embodiment, the resistances 134a-e are 100KΩ resistances. The resistances 34a-e are connected to same node 136, which is connected to ground 139 through a resistance 138 which creates a voltage divider and to the actuator 24. In a particular embodiment, the resistance 138 is a 1KΩ resistance.

If the transmission is engaged in Park, no signal is transmitted to the receiving unit 23. If the transmission is engaged in a position included in the first group, the transmission positioning system 14 emits a signal through the corresponding output D, R, N, O or L, which is transmitted to the node 136 through the respective resistance 134a-e.

The actuator 24 comprises an operational amplifier 154, and a transistor 40. The operational amplifier 154 includes a positive input terminal 160a which is connected to the receiving unit 23 through the node 136, a negative input terminal 160b which is connected to a voltage divider 170, a negative power supply terminal 160c which is connected to ground 161, a positive power supply terminal 160d connected to a power source 50, and an exit terminal 160e which is connected to the transistor 40 through a resistance 168. In a particular embodiment, the resistance 168 is a 1KΩ/0.5 W resistance, and the power source 50 has a 12 volt capacity.

The voltage divider 170 is composed of a first resistance 174 connected between ground 176 and the negative input terminal 160b and a second resistance 172 connected between the power source 50 and the negative input terminal 160b. In a particular embodiment, the first resistance 174 is a 1KΩ resistance, and the second resistance 172 is a 200KΩ resistance. In a particular embodiment, the voltage divider provides a reference voltage of 0.75 mV at the negative input terminal 160b.

The transistor 40 includes a first electrode 40a connected to the resistance 168, a second electrode 40b connected to ground 42, and a third electrode 40c. When a signal is transmitted from the operational amplifier 160 through the resistance 168 to the first electrode 40a, the transistor 40 opens a channel between the second and third electrodes 40b,c. The transistor 40 can be any appropriate type of transistor know in the art, for example FET (MOSFET, JFET), BJT (NPN, PNP), etc.

The blocking unit 26 is similar to that of the previously described embodiment, with a relay 46 in parallel with a diode 48, which are connected to the third electrode 40c of the transistor 40 and to the power source 50.

When the operational amplifier 160 receives the signal from the transmission positioning system 14, a voltage is produced at the exit terminal 160e. When the transistor 40 receives the signal from the exit terminal 160e through the resistance 168, the open channel between the second and third electrodes 40b,c allows current to flow from the power source 50 to ground 42, thereby generating a current across the relay 46. The relay 46 interconnects the stop switch 16 and engine control unit 18, and is normally closed to allow the stop engine signal from circulating therebetween. The relay 46 opens only when the current passes therethrough, thus interrupting the connection between the stop switch 16 and the engine control unit 18 and preventing transmission of the stop engine signal. The relay can be similar to that shown in FIG. 6 and previously described.

In an alternate embodiment which is not shown, the receiving unit 23 is connected to each output defining the transmission positions of the first and second group, and receives a different signal from each of the outputs or a same signal from each output which is part of the first group and a same signal, different from that of the first group, for each output which is part of the second group. The receiving unit 23 determines whether the transmission is engaged in a position included in the first or in the second group based on the characteristics of the signal received. Alternately, a single connection between the receiving unit 23 and the transmission positioning system 14 can be provided, through which is circulated a signal having different characteristics based on the selected transmission position.

It should be noted that the present specification, whenever it is mentioned that the engine of the vehicle is shut down, it is assumed that the engine was previously running.

It should also be noted that in a particular embodiment, the shutdown prevention system does not affect other functions that the stop switch 16 may have besides sending a stop engine signal, e.g. in the case where the stop switch 16 is a push-button starter, the shutdown prevention system does not affect the ability of the switch to send a starting signal to the engine control unit to start the engine. For instance, there may be other connections between the push-button starter and the engine control unit 18, for example to circulate a starting signal, and the engine shutdown system affects only the ability to stop the engine.

The above description is meant to be exemplary only, and one skilled in the art will recognize that changes may be made to the embodiments described without departing from the scope of the invention disclosed. It is apparent that the present shutdown prevention system is not limited solely to an electric circuit system, but may alternatively be simulated by a mechanical or computer based system. Still other modifications which fall within the scope of the present invention will be apparent to those skilled in the art, in light of a review of this disclosure, and such modifications are intended to fall within the appended claims.

The invention claimed is:

1. A vehicle engine shutdown prevention system comprising:
 a position determination module adapted to be connected to a transmission of the engine for determining if the transmission is engaged in a position included in a first group of transmission positions or in a second group of transmission positions, the second group including at least one position for which the vehicle remains stationary when the engine is shut down, and the first group including all the transmission positions which are not included in the second group, the position determination module emitting a block signal when the transmission is engaged in one of the first group of positions; and
 a blocking unit adapted to interconnect a user actuated switch and an engine control unit and to define the only path through which a stop engine signal for turning off the engine may circulate from the user actuated switch and the engine control unit, the blocking unit receiving the block signal from the position determination module, the blocking unit blocking the path between the user actuated switch and the engine control unit when said blocking unit receives the block signal, such as to prevent the stop engine signal from circulating from the user actuated switch to the engine control unit when the transmission is engaged in one of the first group of positions.

2. The system according to claim 1, wherein the position determination module is adapted to be connected to a transmission positioning system of the transmission, the transmission positioning system emitting a position signal based on the position the transmission is engaged in, the position determination module being adapted to receive the position signal and determining if the transmission is engaged in a position included in the first or second group based on the position signal.

3. The system according to claim 2, wherein the position determination module includes a receiving unit adapted to be connected to the transmission positioning system and to receive the position signal, the receiving unit determining if the transmission is engaged in a position included in the first or second group based on the position signal and emitting an actuation signal when the transmission is engaged in a position includes in the first group, and an actuator receiving the actuation signal and emitting the block signal upon reception of the actuation signal.

4. The system according to claim 1, wherein the position determination module includes a transmission positioning system, the transmission positioning system being adapted to receive transmission data from the transmission providing information on the position the transmission is engaged in, and the position determination module determining if the transmission is engaged in a position included in the first or second group based on the transmission data.

5. The system according to claim 4, wherein the transmission positioning system emits a position signal based on the transmission data, the position determination module further including a receiving unit receiving the position signal, the receiving unit determining if the transmission is engaged in a position included in the first or second group based on the position signal and emitting an actuation signal when the transmission is engaged in a position includes in the first group, and an actuator receiving the actuation signal and emitting the block signal upon reception of the actuation signal.

6. The system according to claim 1, wherein the blocking unit includes a relay adapted to be connected in series with and between the engine control unit and the user actuated switch.

7. The system according to claim 6, wherein the position determination module includes a transistor which generates the block signal by forming a circuit between the relay and a power source when the transmission is engaged in a position included in the first group.

8. The system according to claim 6, wherein the relay is normally closed, and opens only upon receipt of the block signal.

9. The system according to claim 1, wherein the user actuated switch is a push-button engine starter.

10. The system according to claim 2, wherein the transmission positioning system includes an output for each transmission position, and the position determination module is adapted to be connected to the output of each transmission position which is included in the first group only.

11. The system according to claim 5, wherein the transmission positioning system includes an output for each transmission position, and the receiving unit is connected to the output of each transmission position which is included in the first group only.

12. The system according to claim 1, wherein the second group of transmission positions includes only Park.

13. The system according to claim 1, wherein the second group of transmission positions includes only Park and Neutral.

14. A method for selectively preventing an engine of a vehicle from being turned off, the method comprising:
 receiving a signal indicative of a position of a transmission of the engine;
 determining if the position of the transmission is part of a first or second group of transmission positions, the second group including at least one position for which the vehicle remains stationary when the engine is shut down, the first group including all the transmission positions which are not included in the second group,
 activating a blocking unit when the transmission is engaged in a position which is included in the first group, and
 with the activated blocking unit, preventing a stop engine signal from being transmitted from a user actuated switch to an engine control unit, such as to prevent the switch from actuating the engine control unit to turn off the engine when the transmission is engaged in one of the first group of transmission positions.

15. The method according to claim 14, wherein the step of activating the blocking unit further comprises opening a normally-closed circuit interconnecting the user actuated switch and the engine control unit, the circuit defining the only path through which the stop engine signal may be transmitted from the user actuated switch to the engine control unit.

16. The method according to claim 14, further comprising, before receiving the signal indicative of the transmission position, receiving transmission data indicative of the transmission position from the transmission, and emitting the signal based on the transmission data.

17. The method according to claim 14, wherein activating the blocking unit includes emitting an actuation signal when the transmission is engaged in a position which is included in the first group, and receiving the actuation signal with the blocking unit.

18. The method according to claim 14, wherein the second group of transmission positions includes only Park.

19. The method according to claim 14, wherein the second group of transmission positions includes only Park and Neutral.

* * * * *

UNITED STATES PATENT AND TRADEMARK OFFICE
CERTIFICATE OF CORRECTION

| | | |
|---|---|---|
| PATENT NO. | : 8,142,331 B2 | Page 1 of 1 |
| APPLICATION NO. | : 12/729647 | |
| DATED | : March 27, 2012 | |
| INVENTOR(S) | : Radu Ioan Burdeti | |

It is certified that error appears in the above-identified patent and that said Letters Patent is hereby corrected as shown below:

TITLE PAGE:

ITEM 73 SHOULD READ -- STUDIOS ALLUMAGE INC. --

Signed and Sealed this
Fifth Day of June, 2012

David J. Kappos
*Director of the United States Patent and Trademark Office*